UNITED STATES PATENT OFFICE

KARL THIESS AND THEODOR MEISSNER, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

INDIGOID VAT DYESTUFFS AND PROCESS OF PREPARING THEM

No Drawing. Application filed May 3, 1929, Serial No. 360,320, and in Germany November 25, 1925.

The present invention relates to indigoid vat dyestuffs dyeing blue tints and process of preparing them.

We have found that vat dyestuffs are obtainable dyeing the fiber blue to greenish-blue tints and being also suitable for calico printing by condensing an isatin-alpha-compound of the following general formula:

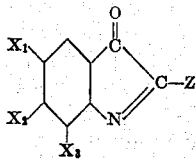

wherein
$X_1$ stands for halogen,
$X_2$ for halogen or alkyl,
$X_3$ for alkyl and
Z for halogen or an arylide residue, with a hydroxythionaphthene of the following general formula:

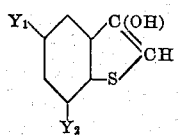

wherein
$Y_1$ stands for halogen or alkyl and
$Y_2$ for hydrogen, halogen or alkyl.

The condensation may be carried out by causing the components to act upon each other in the presence of a solvent such as chlorobenzene, benzene, nitrobenzene or the like or, when using substituted isatin-alpha-arylides, in the presence of alcohol, acetic anhydride or water. If required, the reaction may be accelerated by moderately heating the mass.

The dyestuffs thus obtainable are compounds of the following general formula:

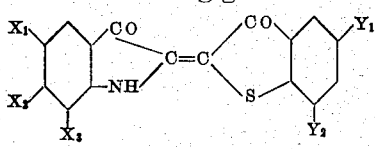

wherein
$X_1$ stands for halogen,
$X_2$ for halogen or alkyl,
$X_3$ for alkyl,
$Y_1$ for halogen or alkyl and
$Y_2$ for hydrogen, halogen or alkyl. They form vat dyestuffs dyeing blue tints of very good fastness properties especially to washing and boiling.

The following examples serve to illustrate our invention but they are not intended to limit it thereto, the parts being by weight.

1. 26.3 parts of 5-bromo-6-chloro-7-methyl-isatin are suspended in about 250 parts of chlorobenzene and heated, after the addition of 22 parts of phosphorus pentachloride, until solution has been effected. The solution of the 5-bromo-6-chloro-7-methyl-isatin-alpha-chloride thus produced is run into a solution of 19.9 parts of 5-chloro-7-methyl-3-hydroxy-thionaphthene in 200 parts of chlorobenzene, whereupon the 5-chloro-7-methyl-2-thionaphthene-5'-bromo-6'-chloro-7'-methyl-2'-indolindigo immediately separates. After heating for a short time at 80° C. to 90° C., the dyestuff is filtered, washed with chlorobenzene and then with alcohol and dried. It dyes the fiber from a golden-yellow vat a greenish-blue.

2. By replacing in Example 1 the 5-bromo-6-chloro-7-methyl-isatin by 23 parts of 5.6-dichloro-7-methyl-isatin and otherwise proceeding in an analogous manner, the 5-chloro-7-methyl-2-thionaphthene-5'-6'-dichloro-7'-methyl-2'-indolindigo is obtained. It dyes the fiber from a golden-yellow vat a similar shade but somewhat more reddish than the dyestuff obtained in Example 1.

3. 26.3 parts of 5-bromo-6-chloro-7-methyl-isatin are converted into the corresponding isatin-alpha-chloride by heating with 22 parts of phosphorus pentachloride in about 250 parts of chlorobenzene. By combining this solution with a solution of 18.5 parts of 5-chloro-3-hydroxy-thionaphthene in about 200 parts of chlorobenzene, the 5-chloro-2-thionaphthene-5'-bromo-6'-chloro-7'-methyl-2'-indolindigo is obtained. This dyestuff dyes the fiber from a yellow vat bluish shades.

4. 21 parts of 5-chloro-6.7-dimethyl-isatin are heated with 22 parts of phosphorus pentachloride in about 250 parts of chlorobenzene until solution has been effected and this solution is combined with a solution of 19.9 parts of 5-chloro-7-methyl-3-hydroxy-thionaphthene in about 250 parts of chlorobenzene. The 5-chloro-7-methyl-2-thionaphthene-5'-chloro-6'-7'-dimethyl-2'-indolindigo, after being worked up in the usual manner, dyes the fiber from a yellowish-red vat blue tints.

5. By replacing in Example 4 the 5-chloro-7-methyl-3-hydroxy-thionaphthene by the same quantity of 5-methyl-7-chloro-3-hydroxy-thionaphthene and otherwise proceeding in the same manner, the 5-methyl-7-chloro-2-thionaphthene-5'-chloro-6'-7'-dimethyl-2'-indolindigo is obtained which dyes the fiber from a yellow vat reddish-blue tints.

6. 21 parts of 5-chloro-6.7-dimethyl-isatin are suspended in about 250 parts of chlorobenzene and heated, after the addition of 22 parts of phosphorus pentachloride, until solution is effected. This solution of 5-chloro-6.7-dimethyl-isatin-alpha-chloride is run at between 40° C. and 50° C. into a solution of 17.8 parts of 5.7-dimethyl-3-hydroxy-thionaphthene in 200 parts of chlorobenzene, whereupon the 5.7-dimethyl-2-thionaphthene-5'-chloro-6'-7'-dimethyl-2'-indolindigo immediately separates. After a short heating at between 80° C. and 90° C. the dyestuff is filtered, washed with chlorobenzene and then with alcohol and dried. It forms a blue powder which dyes the fiber from a yellow-olive vat greenish-blue tints of good fastness to washing and boiling.

7. By replacing in Example 6 the 5-chloro-6.7-dimethyl-isatin by 25.5 parts of 5-bromo-6.7-dimethyl-isatin and otherwise working in the same manner, the 5.7-dimethyl-2-thionaphthene-5'-bromo-6'-7'-dimenthyl-2-indolindigo is obtained which dyes the fiber from a yellow-olive vat a similar shade of the same fastness properties as the dyestuff obtained according to Example 6.

8. 21 parts of 5-chloro-6.7-dimethyl-isatin are transformed into the corresponding isatin-alpha-chloride by heating with 22 parts of phosphorus pentachloride in about 250 parts of chlorobenzene. By the combination of the solution with a solution of 18.5 parts of 5-chloro-3-hydroxy-thionaphthene in about 200 parts of chlorobenzene, the 5-chloro-2-thionaphthene-5'-chloro-6'.7'-dimethyl-2'-indolindigo is obtained. This dyestuff dyes the fiber from a yellow vat dull blue tints.

We claim:

1. As new products, the compounds of the following general formula:

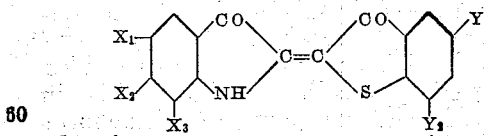

wherein
$X_1$ stands for halogen,
$X_2$ for halogen or alkyl,
$X_3$ for alkyl,
$Y_1$ for halogen or alkyl and
$Y_2$ for hydrogen, halogen or alkyl dyeing the fiber from a vat blue tints.

2. As new products, the compounds of the following formula:

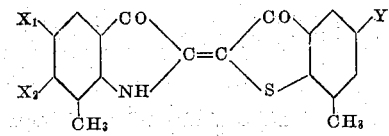

wherein
$X_1$ stands for halogen,
$X_2$ for halogen or alkyl and
$Y_1$ for halogen or alkyl dyeing the fiber from a vat blue tints.

3. As a new product, 5.7-dimethyl-2-thionaphthalene-5'-chloro-6'.7'-dimethyl-2'-indolindigo forming a blue powder which dyes the fiber from a yellow-olive vat greenish-blue tints of good fastness to washing and boiling.

4. As a new product, 5-chloro-7-methyl-2-thionaphthalene-5'-6'-dichloro-7'-methyl-2'-indolindigo dyeing the fiber from a golden-yellow vat greenish-blue tints.

5. As a new product, 5-chloro-2-thionaphthalene-5'-bromo-6'-chloro-7'-methyl-2'-indolindigo dyeing the fiber from a yellow vat bluish tints.

In testimony whereof, we affix our signatures.

KARL THIESS.
THEODOR MEISSNER.

CERTIFICATE OF CORRECTION.

Patent No. 1,830,861.             Granted November 10, 1931, to

KARL THIESS ET AL.

It is hereby certified that error appears in the printed specification of the above numbered patent requiring correction as follows: Page 2, lines 80 and 81, claim 3, and lines 90 and 91, claim 5, respectively, for "thionaphthalene" read thionaphtene; and that the said Letters Patent should be read with these corrections therein that the same may conform to the record of the case in the Patent Office.

Signed and sealed this 22nd day of December, A. D. 1931.

(Seal)

M. J. Moore,
Acting Commissioner of Patents.